(12) United States Patent
Yahagi et al.

(10) Patent No.: US 9,103,354 B2
(45) Date of Patent: Aug. 11, 2015

(54) ELECTRIC BRAKE CONTROL APPARATUS

(71) Applicant: Hitachi Automotive Systems, Ltd., Hitachinaka-shi, Ibaraki (JP)

(72) Inventors: Yasuo Yahagi, Tokyo (JP); Makoto Kobayashi, Isesaki (JP); Ryota Takagi, Isesaki (JP); Kazuaki Nagashima, Kiryu (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 20 days.

(21) Appl. No.: 13/956,061

(22) Filed: Jul. 31, 2013

(65) Prior Publication Data

US 2014/0053545 A1 Feb. 27, 2014

(30) Foreign Application Priority Data

Aug. 24, 2012 (JP) ................. 2012-184767

(51) Int. Cl.

| | |
|---|---|
| *F15B 15/00* | (2006.01) |
| *B60T 8/36* | (2006.01) |
| *B60T 13/66* | (2006.01) |
| *B60T 13/68* | (2006.01) |
| *B60T 13/74* | (2006.01) |
| *B60T 17/02* | (2006.01) |
| *H02K 11/00* | (2006.01) |
| *H01R 4/64* | (2006.01) |
| *H02K 7/14* | (2006.01) |
| *H02K 11/02* | (2006.01) |

(52) U.S. Cl.
CPC ................. *F15B 15/00* (2013.01); *B60T 8/368* (2013.01); *B60T 13/662* (2013.01); *B60T 13/686* (2013.01); *B60T 13/745* (2013.01); *B60T 17/02* (2013.01); *H02K 11/0089* (2013.01); *H01R 4/64* (2013.01); *H02K 7/14* (2013.01); *H02K 11/02* (2013.01)

(58) Field of Classification Search
USPC ........... 303/10, 116.4, 119.1–119.3; 417/360, 417/410.1
See application file for complete search history.

(56) References Cited

U.S. PATENT DOCUMENTS

| | | | | |
|---|---|---|---|---|
| 5,022,717 | A | * | 6/1991 | Heibel et al. ............... 303/119.3 |
| 5,992,946 | A | * | 11/1999 | Bayer et al. ............... 303/113.1 |
| 6,241,489 | B1 | * | 6/2001 | Lewin et al. ............... 417/410.1 |
| 6,244,671 | B1 | | 6/2001 | Tamai |
| 6,945,757 | B2 | * | 9/2005 | Hartel et al. .................. 417/360 |
| 7,516,823 | B2 | * | 4/2009 | Kikuchi et al. ............... 188/158 |
| 7,703,862 | B2 | * | 4/2010 | Abe et al. .................... 303/119.3 |
| 2007/0252431 | A1 | | 11/2007 | Tsunooka et al. |
| 2008/0017174 | A1 | | 1/2008 | Kafer et al. |
| 2012/0195007 | A1 | | 8/2012 | Yanai et al. |

FOREIGN PATENT DOCUMENTS

| | | |
|---|---|---|
| DE | 10 2005 047 919 A1 | 4/2007 |
| DE | 10 2007 000 239 A1 | 10/2007 |

(Continued)

OTHER PUBLICATIONS

European Search Report dated Dec. 10, 2013 (five (5) pages).

*Primary Examiner* — Christopher Schwartz
(74) *Attorney, Agent, or Firm* — Crowell & Moring LLP

(57) ABSTRACT

It is an object to reduce noise leakage out of an apparatus, and improve reliability of an electric brake control apparatus. An electric brake control apparatus includes: a motor that includes a housing made of a conductive member; a control unit that performs drive control of the motor; and a hydraulic unit that includes a housing made of a conductive member, and further includes a conductive connection member that electrically connects a ground line of the control unit, the housing of the motor and the housing of the hydraulic unit to each other.

2 Claims, 9 Drawing Sheets

(56) References Cited

FOREIGN PATENT DOCUMENTS

| | | | |
|---|---|---|---|
| EP | 1 975 447 | A1 | 10/2008 |
| EP | 2 346 153 | A1 | 7/2011 |
| JP | 2006-203990 | A | 8/2006 |
| JP | 2007-290596 | A | 11/2007 |
| JP | 2008-238987 | A | 10/2008 |
| WO | WO 2005/058664 | A2 | 6/2005 |

* cited by examiner

ELECTRIC BRAKE CONTROL APPARATUS

INCORPORATION BY REFERENCE

The present application claims priority from Japanese application JP2012-184767 filed on Aug. 24, 2012, the content of which is hereby incorporated by reference into this application.

BACKGROUND OF THE INVENTION

The present invention relates to a brake control apparatus using a motor as a power supply.

Background arts of this technical field include JP-A-2007-290596 corresponding to U.S. Patent Publication No. 2007/252431. This gazette describes "in a brake fluid pressure controlling unit employed for a hydraulic brake system having an ESC function and the like for a vehicle, electronic components, such as pressure sensors, embedded in a fluid pressure controlling block are allowed to be used in a more severe noise environment without being replaced with components having high noise immunity". In order to achieve this, the gazette also describes "a brake fluid pressure controlling unit for a vehicle, comprising: a metal fluid pressure controlling block that is electrically connected with a body of the vehicle; a cover that is fixed to the fluid pressure controlling block; a circuit board on which an electronic control unit is mounted and which is received inside the cover; and an electric component, such as a pressure sensor, attached to the fluid pressure controlling block, wherein the fluid pressure controlling block and a grounded portion EG of the circuit board are electrically conducted via an electric connection member that is connected to the grounded portion in the cover."

The arts also include JP-A-2006-203990. This gazette describes "since a conventional motor drive system can suppress leakage current to a GND by attaching a reactor to each connection line and the like but is required to be provided with many reactors to suppress leakage current to thereby increase the number of components and cause a problem of increasing the size of a control apparatus, a motor drive system is thus provided that includes: a motor including a housing configured by a conductive member; and a control apparatus performing drive control of the motor, wherein a ground line of the control apparatus is electrically connected to the housing of the motor, and the ground line of the control apparatus is integrated with a line that is for driving the motor and electrically connects the motor to the control apparatus into one bundle".

The arts further include JP-A-2008-238987 corresponding to U.S. Pat. No. 7,516,823. This gazette describes "to reduce the influence of the noise concerned in the electric braking apparatus", "including a motor for pressing brake pads on disks, a metal housing for housing the motor, a positive-polarity power line for transmitting power from a battery to the electric motor, a negative-polarity ground line for connecting the electric motor to the ground of a vehicle, and a conductor for electrically connecting the metal housing to the negative polarity of the battery or the negative-polarity of an inverter".

SUMMARY OF THE INVENTION

Conventionally, a brake for a vehicle, such as an automobile, employs a system where a tread force of a driver is applied to a brake pedal, and the tread force is amplified by a brake booster and applied to a piston of a brake master cylinder. This system converts the tread force into the pressure of liquid sealed in an apparatus. Typically, oil is employed as the liquid. The liquid pressure is transmitted to the brake cylinder for each wheel via pipes, and the vehicle is braked.

In recent years, electrification of apparatuses in vehicles has developed. In addition to the brake operated by a driver, a system is incorporated that transmits control signals to an apparatus controlling a hydraulic pressure on the basis of data from a vehicle speed meter and an acceleration sensor that are incorporated in a vehicle to control operations of motors and the like, thereby allowing automatic drive control on brakes and the like with no intention of the driver. Thus, the vehicle skidding, which may occur depending on road surface conditions, can be prevented, and running safety can be secured. One of such apparatuses is an apparatus having an ESC (electric stability control) function (ESC apparatus, or simply called ESC). This apparatus is also referred to as an apparatus for preventing skidding or a vehicle safety control apparatus.

When a vehicle-mounted electronic apparatus, which is not necessarily the ESC apparatus, operates, the apparatus itself generates electromagnetic waves. Accordingly, in the vehicle-mounted electronic apparatus, adverse effects of electromagnetic waves exerting on another apparatus (concerning emission) and adverse effects of electromagnetic waves being exerted by another apparatus (concerning immunity or sensitivity) should be minimized. An electronic apparatus should be designed in consideration of features called electromagnetic compatibility (EMC). To put it plainly, the electromagnetic compatibility means that an operation of one apparatus A does not electromagnetically affect an operation of another apparatus, and the operation of the apparatus A is not electromagnetically affected by the operation of the other apparatus. Basic methods of evaluating the effects have been issued by international organizations, such as ISO, WC and CISPR.

In order to secure electromagnetic compatibility of an electronic apparatus, it is first required to prevent noise from intruding into the electronic apparatus. To achieve this, adoption of a configuration called an LC filter and a diode has typically been known; in the configuration, for instance, an inductance element is in series in a power source line, and the power source line is arranged via a capacitance element, in order to prevent noise from an external power source from reaching a controller of an apparatus. Noise from the outside can be prevented by this method. However, noise cannot be prevented from leaking out of an electronic apparatus only by this method. It is required to prevent noise from leaking out of the electronic apparatus; this requirement is a problem. Thus, it is required to achieve electromagnetic compatibility of the electronic apparatus while securing reliability of electric connection between units that configure the apparatus. Furthermore, there is another problem in that a process of manufacturing an apparatus should be simplified, and, in this process, unnecessary application of a mechanical load to components that configure the electronic apparatus should be avoided.

Thus, it is an object of the present invention to solve the above problems, in particular, leakage of noise out of an apparatus, and to improve reliability of an electric brake control apparatus.

In order to solve the problems, for instance, configurations described in claims are adopted.

The present application includes multiple measures for solving the problems. Among the measures, an example can be described as follows. An electric brake control apparatus includes: a motor that comprises a housing made of a conductive member; a control unit that performs drive control of the motor; and a hydraulic unit that comprises a housing made of a conductive member. The ground line of the control unit, the housing of the motor and the housing of the hydraulic unit are electrically connected to each other by a conductive member.

Furthermore, the conductive member for electrically connecting the ground line of the control unit and the control unit and the hydraulic unit has an elongated rod-shaped pin structure.

Moreover, a pin structure having a conductive elongated rod shape or a structural member including a pin structure having a conductive elongated rod shape is fixed into the hole formed in the hydraulic unit.

Furthermore, the pin structure having a conductive elongated rod shape or the structural member including a pin structure having a conductive elongated rod shape has a structure fitted into the hydraulic unit.

Moreover, the pin structure having a conductive elongated rod shape or the structural member including a pin structure having a conductive elongated rod shape also serves as a pin structure having a function of spatially aligning the control unit with the hydraulic unit.

Furthermore, a part of a conductive member that electrically connects the housing of the motor to the housing of the hydraulic unit is fixed by an insulator.

Moreover, the structure that connects the ground line of the control unit to the housing of the hydraulic unit has a fitting structure.

The present invention can improve reliability of an electric brake control apparatus.

Furthermore, the present invention can prevent noise from leaking out of the apparatus, and prevent adverse effects from being exerted on another apparatus, while allowing the apparatus to be easily designed and manufactured.

Moreover, the present invention can secure reliability of electrical connection.

Other objects, features and advantages of the invention will become apparent from the following description of the embodiments of the invention taken in conjunction with the accompanying drawings.

DETAILED DESCRIPTION OF THE EMBODIMENTS

Embodiments of the present invention will hereinafter be described in detail with reference to drawings. In all the drawings for illustrating the embodiments, the same symbols are assigned to the same components in principle, and repetitive description is omitted.

Embodiment 1

Figure 1:
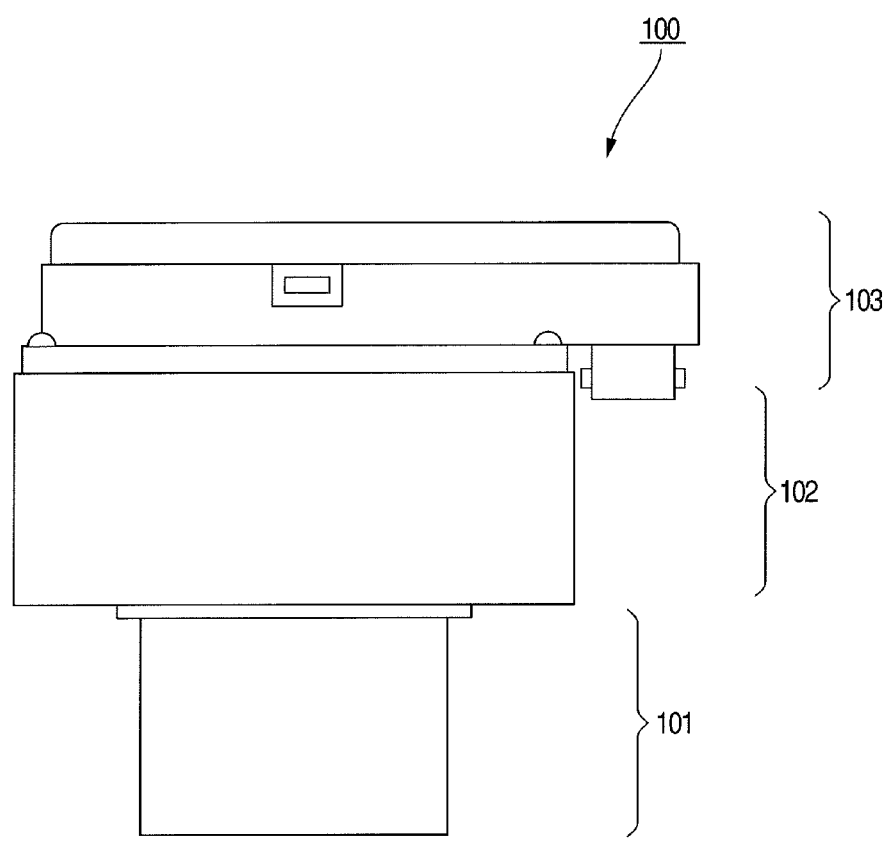
FIG. 1 is an example of a configurational diagram of an ESC apparatus.

In this embodiment, description is made by exemplifying an ESC apparatus as an electric brake control apparatus. As shown in FIG. 1, the ESC apparatus 100 generally includes three units, which are a motor 101; a hydraulic unit (HU) 102 that utilizes rotational movement of the motor to generate a hydraulic pressure and determines a transmission path of the hydraulic pressure by opening and closing an electromagnetic valve; and an electronic control unit (ECU) 103 that includes a printed circuit board (PCB) for drive control of the motor and control of opening and closing the electromagnetic valve. The ESC apparatus 100 of the present invention has a configuration that connects the motor 101 to the electronic control unit via the hydraulic unit 102.

Figure 2:
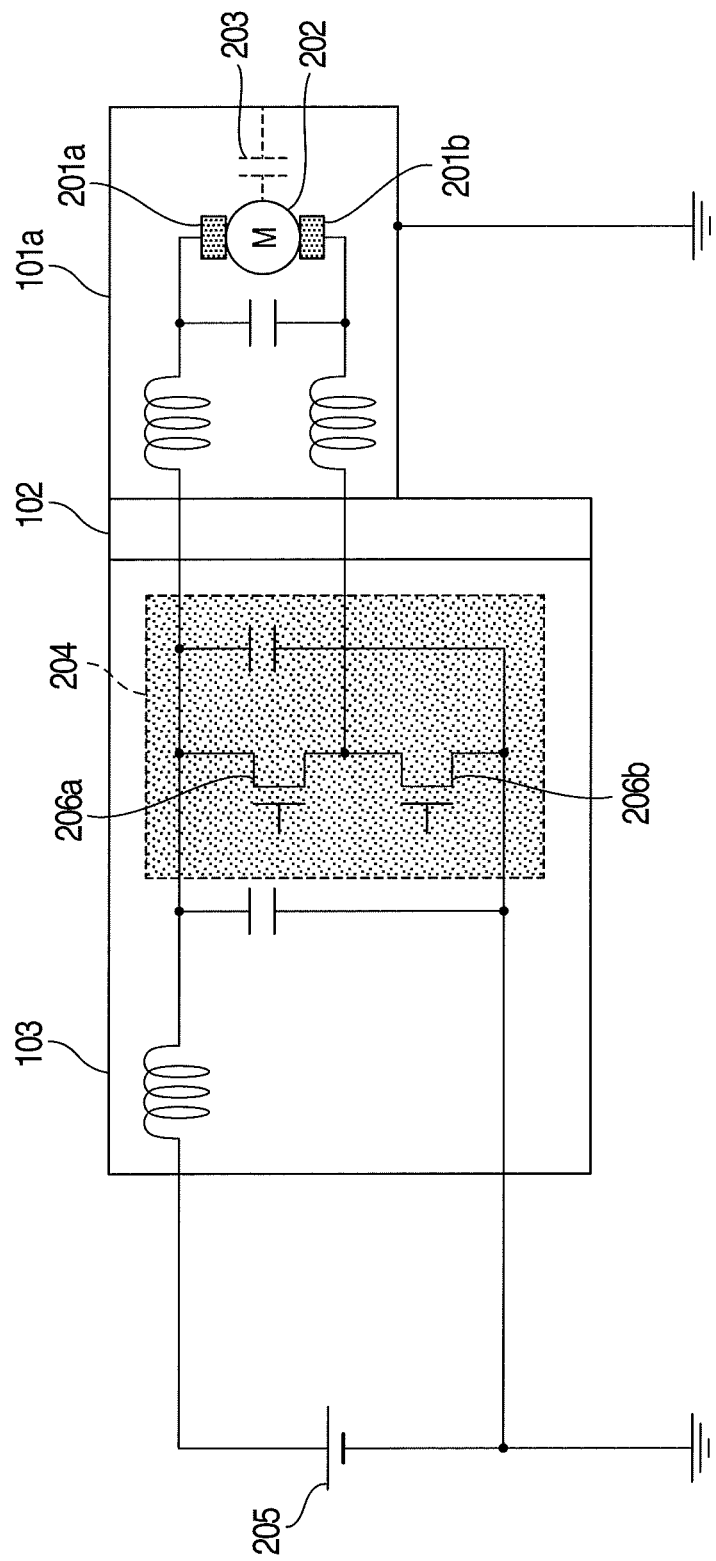
FIG. 2 is a diagram schematically showing an example of an equivalent circuit of a conventional ESC apparatus.

FIG. 2 is a diagram showing a conventional ESC apparatus in an equivalent circuit. A motor driving circuit in the case of adopting a DC motor as the motor of the ESC apparatus and adopting a battery 205 as a power source is represented as an equivalent circuit, which is simplified and schematically represented in this diagram. Accordingly, FIG. 2 does not entirely show all the elements and electrical connections.

In the case of adopting, as the motor, a DC motor that employs brushes 201a and 201b, such as of graphite, for an electric connection to a rotor, it is preferable to add an inductance element or a capacitance element in proximity to a terminal of the motor.

FIG. 2 does not represent the brushes 201a and 201b and the rotor (including a commutator, a coil, and a core) 202 of the motor, as an equivalent circuit, but represents these components as a structural schematic diagram instead.

This diagram also shows capacitance 203 that parasitically exists between coils or the like and the housing of the motor. In the case of the conventional art shown in FIG. 2, a configuration is adopted where inductance elements are added to a power source line of the motor and a ground line of the motor, and these elements are connected by a capacitance element and accommodated in the housing.

In the case of the equivalent circuit shown in FIG. 2, the housing 101a of the DC motor is directly connected to the printed circuit board (PCB) 204 of the ECU 103 only through a power source line terminal and a ground line terminal of the motor. Unfortunately, this configuration cannot prevent noise from leaking out of an external electronic apparatus owing to electromagnetic waves generated by the ESC apparatus.

In comparison therewith, an ESC apparatus of the present invention will be described with reference to FIG. 3.

Figure 3:
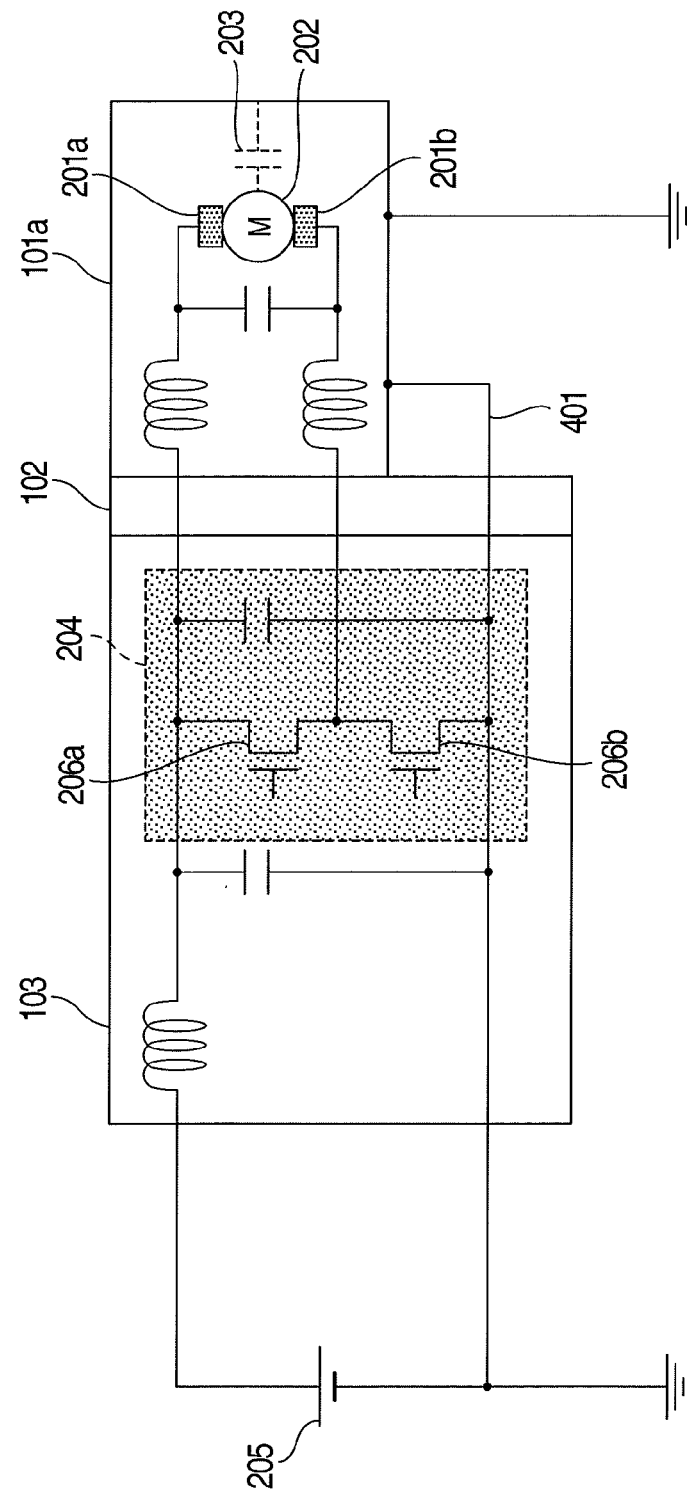
FIG. 3 is a diagram schematically showing an example of an equivalent circuit of an ESC apparatus of the present invention.

FIG. 3 is a diagram representing the ESC apparatus of the present invention as an equivalent circuit. In addition to the conventional configuration in FIG. 2, the housing 101a of the DC motor is electrically connected to a ground of a PCB 204 of the ECU 103 by a conductor 401.

Accordingly, noise, such as overshoot and preshoot, caused by switching itself of elements 206a and 206b arranged on the PCB 204, or noise, such as ringing, caused by switching are allowed to flow from the motor housing via the parasitic capacitance 203 to the ground through the conductor 401. Thus, adverse effects of noise occurring in the ESC apparatus to be exerted out of the ESC apparatus can be reduced.

That is, the noise having flown to the motor housing via the parasitic capacitance 203 does not flow through a path returning again via the ground of the battery 205 to the elements 206a and 206b disposed on the PCB 204, but flows mainly through a path returning again via the conductor 401, which connects the motor housing 101a to the ground of the PCB 204, to elements 206a and 206b, instead. Accordingly, noise occurring in the ESC apparatus can be prevented from leaking out of the apparatus. That is, conventionally, noise occurring in the ESC apparatus temporarily leaks out of the apparatus from the ground, and flows through the path passing to the PCB 204 via the ground that is directly connected to the battery 205; this conventional flow can be prevented. Accordingly, noise occurring in the ESC apparatus can be prevented from leaking out of the ESC apparatus.

Figure 4:
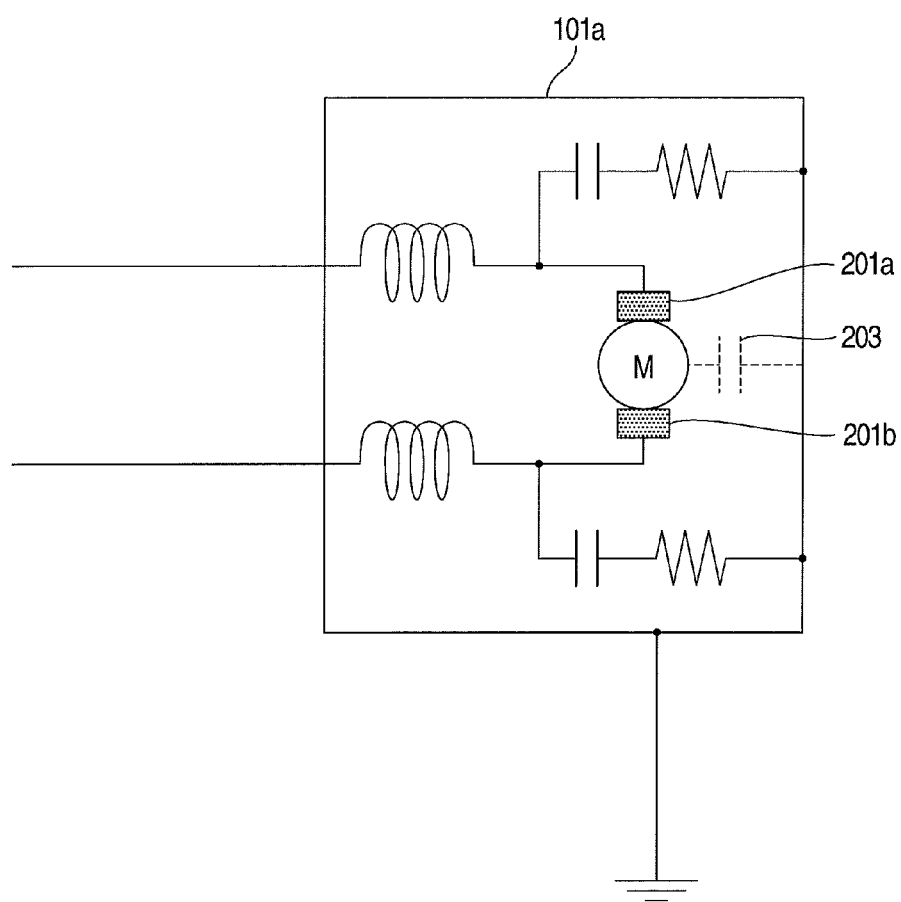
FIG. 4 shows an example of a noise filter circuit added to a DC motor.

The capacitance element is not necessarily connected as shown in FIG. 3. Instead, as shown in FIG. 4 into which a part of the motor housing is excerpt, a circuit configuration may be adopted that directly connects, in series, the power source line of the motor and the ground line of the motor to the housing of the motor by the capacitance element and the resistance element. This configuration can prevent noise occurring from the motor from leaking to the outside.

Next, referring to FIGS. 5 and 6, a specific connection mode of the conductor 401 that electrically connects the housing 101a of the DC motor to the ground of the PCB 204 will hereinafter be described.

Figure 5:
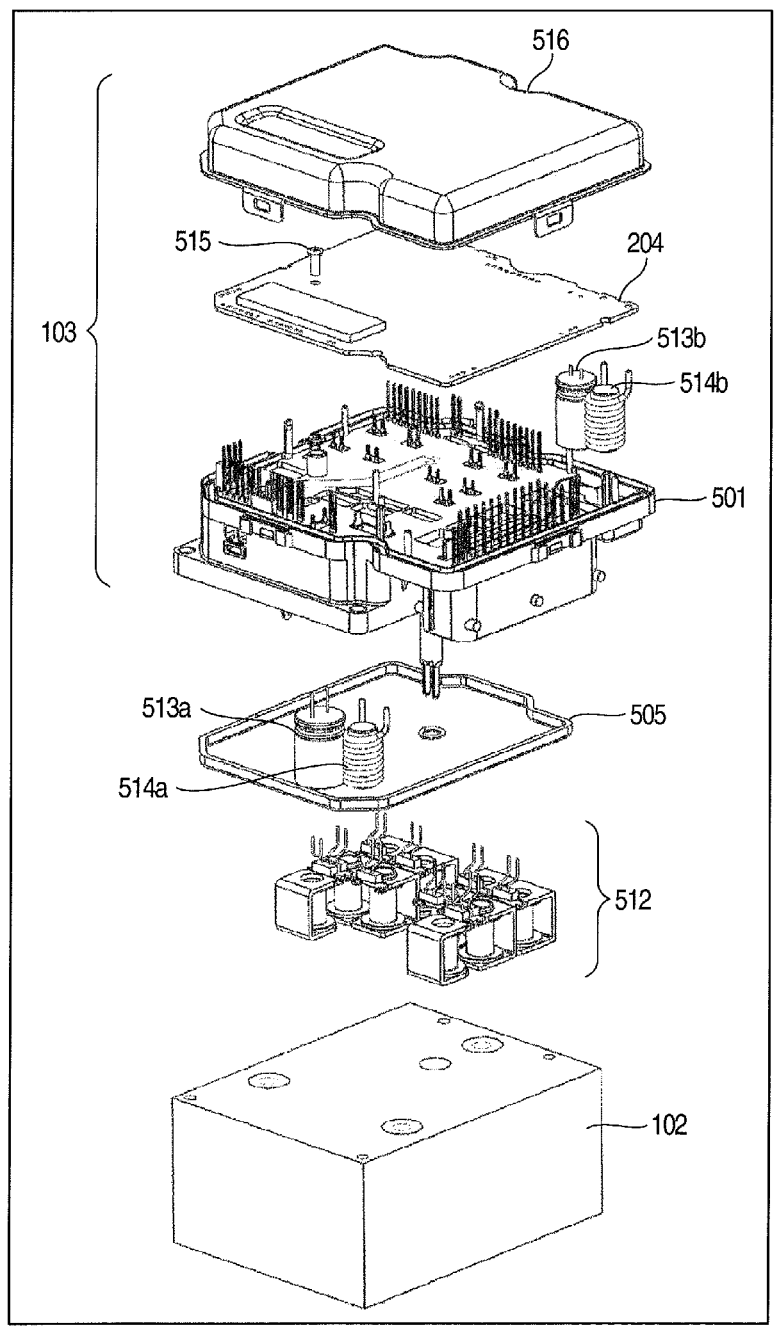
FIG. 5 shows an example of a development view of the ESC apparatus of the present invention.

FIG. 5 shows an example of a component development view where the motor 101 is excluded from the ESC apparatus 100.

The HU 102 includes a pressure sensor (not illustrated) and an electromagnetic valve (not illustrated). The motor (not illustrated in FIG. 5) is mounted on the HU 102. The motor housing 101a and the main body of the HU 102 are made of metal. In the ECU 103, the PCB 204 on which elements are arranged, solenoids 512 as many as the electromagnetic valves (not illustrated), capacitance elements 513a and 513b, and inductance elements 514a and 514b are attached by welding or soldering to a case 501 which is made of resin and into which a plurality of busbars and metal for screw holes are embedded.

To fix the PCB 204, a screw 515 is also used for reinforcement for fixation. A groove into which a watertight ring 505 made of resin is fitted is formed on the outer periphery of the case 501 which is made of resin and into which a plurality of busbars of the ECU 103 are embedded. Finally, the watertight ring 505 made of resin is sandwiched along the groove between the ITU 102 on which the motor 101 is mounted and the ECU 103 to which various components are attached. The positions of the ECU 103 and the HU 102 on which the motor 101 is mounted are aligned with each other. The ECU is pressed into the HU, and fixed by the screw 515. In the figure, a reference numeral 516 designates the lid of the ECU.

Figure 6:
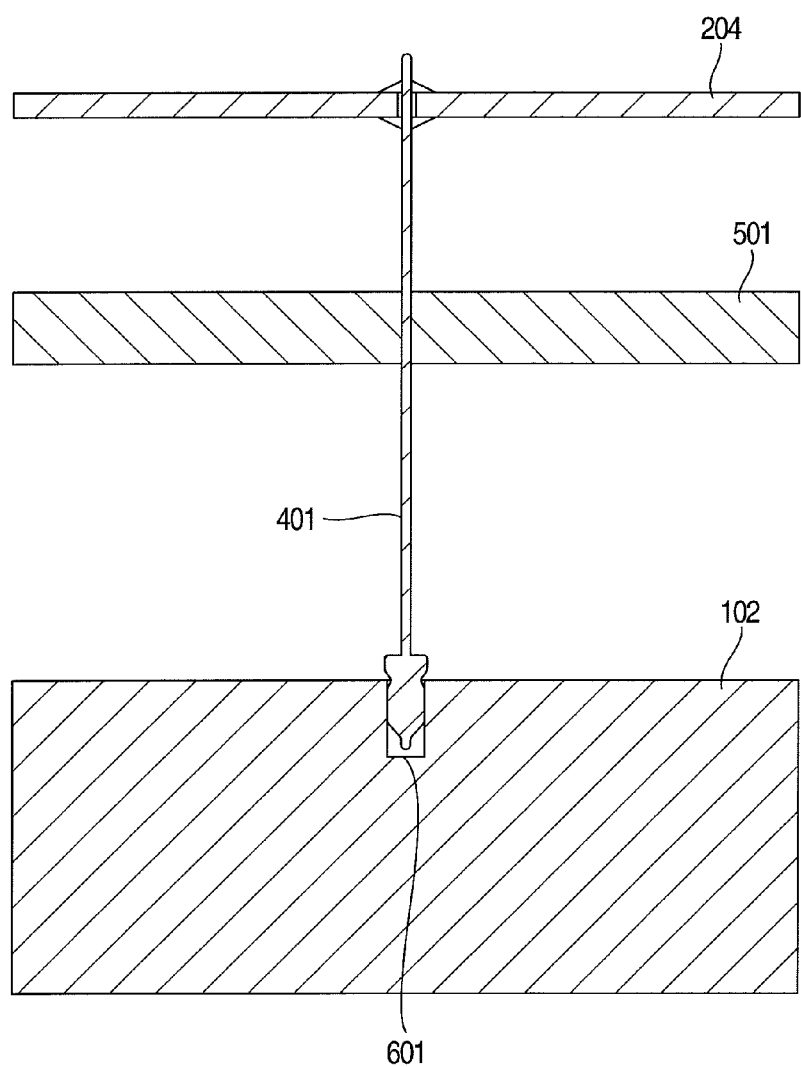
FIG. 6 shows an example of arrangement of a conductor electrically connecting a housing of a motor to a ground of a PCB according to Embodiment 1 of the present invention.

FIG. 6 is an example of a diagram showing a connection part connecting, to the HU, the conductor which electrically connects the housing of the DC motor of the ESC apparatus to the ground of the PCB. As shown in FIG. 6, as with the busbars, the conductor 401, which electrically connects the housing 101a of the DC motor to the ground of the PCB 204, is embedded in the resin case 501 of the ECU 103. A hole 601 is formed in a part of the HU 102 that is in contact with the conductor 401.

The conductor 401 is fixed to the resin case 501 of the ECU 103. The conductor 401 is soldered to the PCB 204. In FIG. 6, the conductor 401 is soldered on both of the upper and rear surfaces of the PCB 204. The conductor 401 is connected such that the distal end of this conductor is inserted into the hole 601. This connection prevents movement of the conductor 401 with respect to the HU 102 due to mechanical vibrations, and can prevent abrasion of the conductor 401 or the HU 102 due to friction between the conductor 401 and the surface of the HU 102.

The motor housing 101a and the main body of the HU 102 are made of metal. Thus, the motor housing 101a is electrically connected to the HU 102. Accordingly, electric connection between the HU 102 and the ground of the PCB 204 via the conductor 401 can be regarded equivalent to electric connection between the housing 101a of the motor and the ground of the PCB 204.

This configuration can secure reliability of electric connection between the housing 101a of the DC motor and the ground of the PCB 204, and can prevent a short circuit caused by adhesion of conductive abrasion pieces to the PCB 204. The conductor 401 is electrically connected and fixed to the ground of the PCB 204 by soldering or the like; connection to the resin case 501 of the ECU 103 is performed in the process for the busbars.

Even in the case of adding a component of electrically connecting the control unit to the hydraulic unit, adoption of the conductor 401 having a pin structure with an elongated rod shape facilitates securement of a space for accommodating a new conductive member, attains a high degree of freedom for designing an electronic apparatus, and can facilitate manufacturing. The pin structure is not limited to a cylindrical column or a rectangular column, but is any of various shapes instead.

The pin structure with an elongated rod shape can reduce the ratio of the part where the conductor 401 is connected to the PCB 204 and the HU 102 with respect to the wiring area of the PCB 204, and the ratio to the surface of the HU 102. Accordingly, a high degree of freedom for arranging components necessary to attain the primary function of the electric brake control apparatus can be attained.

The method of assembling the ESC apparatus is different from a conventional method of sequentially assembling the motor, the HU, the resin case, and the PCB. For instance, the conventional method fixes the conductor that electrically connecting the housing of the motor to the ground of the PCB by inserting a screw between the resin case and the PCB, and a process is separately required to fix the conductor in comparison with the method of the present invention.

Likewise, according to the conventional method (JP-A-2007-290596), one end of the conductor is not fixed to the surface of the HU. Thus, movement and abrasion of the conductor to the HU occurs owing to mechanical vibrations. Accordingly, reliability of electric connection between the housing of the motor and the ground of the PCB cannot be secured, and a short circuit in the PCB due to abrasion dust may occur.

The position where the conductor 401 is connected to the HU 102 on the connection surface may be disposed at any position inside of the watertight ring 505 made of resin that is sandwiched between the resin case 501 of the ECU 103 and the HU 102. Preferably, the position where the conductor 401 is connected to the ground of the PCB 204 is disposed at the periphery of the PCB 204, for facilitating design.

The main factor of noise is switching itself of the elements 206a and 206b disposed on the PCB 204, or ringing and the like caused by switching. Accordingly, the smaller the loop of the circuit including the elements, the motor and the conductor is, the higher the advantageous effects can be exerted. Thus, it is preferable that the conductor be connected to the ground of the PCB 204 in proximity to the element.

As described above, the present invention can prevent noise from leaking out of the electronic apparatus, and improve reliability of the electric brake control apparatus.

Embodiment 2

Figure 7:
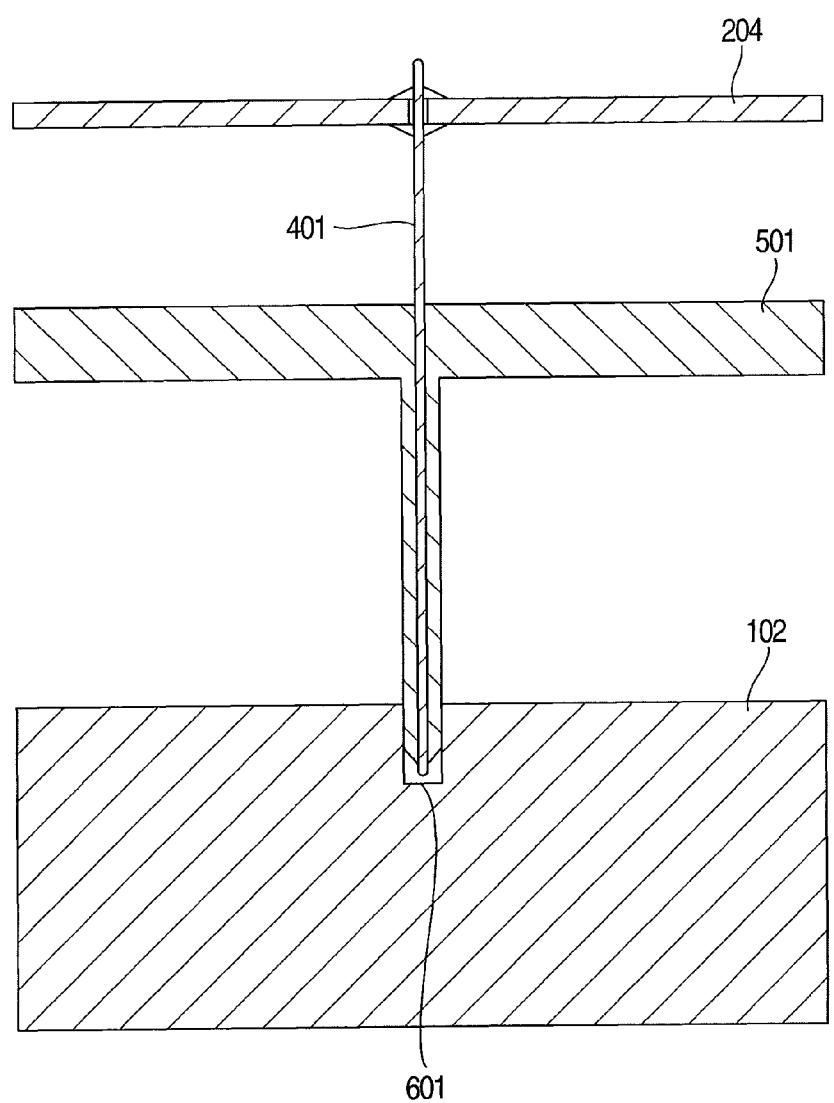
FIG. 7 shows an example of arrangement of a conductor electrically connecting a housing of a motor to a ground of a PCB according to Embodiment 2 of the present invention.

FIG. 7 is a sectional view of the structure of a part connecting, to the HU 102, of the conductor 401 that electrically connects the housing 101a of the DC motor of the ESC apparatus to the ground of the PCB 204 in Embodiment 2.

A structure is adopted where a structural member including the conductor 401 is fitted into the hole 601 formed in the HU 102. The structural member including the conductor 401 fixes this conductor 401 to the resin case 501 of the ECU. The conductor 401 is fixed at the part where the conductor 401 is connected to the PCB 204 on both of the upper and rear surfaces of the PCB 204. Portions other than the distal end on the side where the conductor 401 is connected to the HU 102 are covered with the resin of the resin case 501 of the ECU. It is sufficient that only a part required to plug the hole formed in the HU 102 is covered with resin. Accordingly, abrasion dust caused by friction between the conductor 401 and the HU 102 can be prevented from being released out of the hole formed in the HU 102. In the reverse direction, foreign substances can be prevented from intruding from the outside into the connection between the HU 102 and the conductor 401. Thus, reliability of electric connection can be improved.

Figure 8:
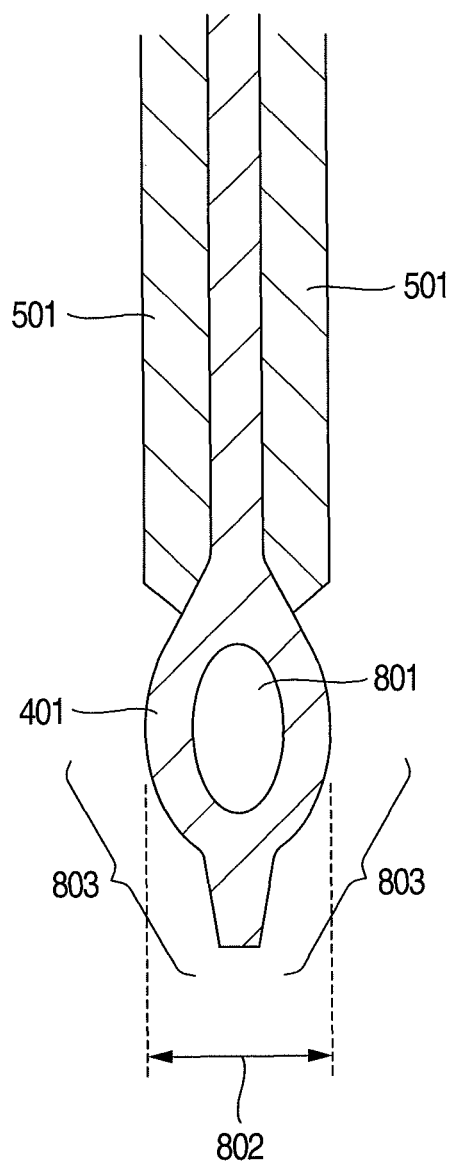
FIG. 8 shows an example of the distal shape of the conductor electrically connecting the housing of the motor to the ground of the PCB according to Embodiment 2 of the present invention.

FIG. 8 shows an example of the shape of the distal end of the conductor 401 that electrically connects the housing 101a of the DC motor to the ground of the PCB 204. The conductor 401 shown in FIG. 8 has a part where the distal end of the conductor 401 is deformed when the conductor 401 is inserted into the HU 102.

The width 802 of the distal end of the conductor 401 is made wider than the hole 601 formed in the HU 102, and a hole 801 is formed. It is preferable that the distal end of the conductor 401 have a taper 803 to be easily inserted into the hole 601 in the HU 102. When the conductor 401 is inserted into the hole 601 formed in the HU 102, the distal end of the conductor 401 is deformed so as to press the hole 801, and applies a force to the inner peripheral surface of the hole 601 formed in the HU 102. It is sufficient that the resin 501 in proximity to the distal end of the conductor 401 plugs the hole 601 formed in the HU 102. A deformable member at the distal end of the conductor 401 may be elastically deformable or plastically deformable.

As described above, mechanical adhesion between the conductor 401 and the HU 102 can be improved, and reliability of electric connection therebetween can be improved.

Accordingly, noise can be prevented from leaking out of the electronic apparatus. Thus, the reliability of the electric brake control apparatus can be improved.

The shape of the distal end of the conductor 401 may be any shape other than the example shown in FIG. 8.

Embodiment 3

Figure 9:
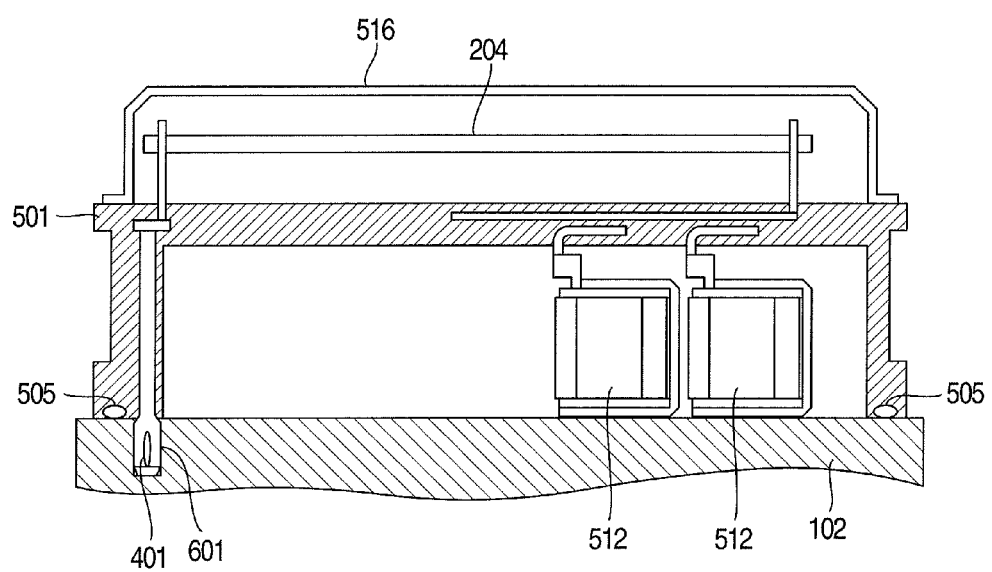
FIG. 9 shows an example of the distal shape of a conductor electrically connecting a housing of a motor to a ground of a PCB according to Embodiment 3 of the present invention.

FIG. 9 is a sectional view of an example of an ESC apparatus of Embodiment 3 of the present invention. A position where the conductor 401 is connected to the ground of the PCB 204 is disposed at a peripheral part of the PCB 204. A structure is adopted that allows a structural member including the conductor 401 is fitted into the hole 601 formed in the HU 102. A portion forming a part of the resin case 501 of the ECU and the conductor 401 function as a plug for the hole.

In this embodiment, a shape equivalent to the shape shown in FIG. 8 is adopted. A deformable portion is formed at the distal end of the conductor 401; the portion is deformed when the conductor 401 is inserted into the HU 102.

In order to avoid providing a position where the conductor 401 is newly inserted on a side of the resin case 501 of the ECU facing the HU 102, the conductor 401 can be inserted into a structural member having already been provided; for instance, a pin for spatial alignment between the ECU 103 and the HU 102 can be adopted.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An electric brake control apparatus, comprising:
   a motor that includes a housing made of a conductive member;
   a control unit that performs drive control of the motor;
   a hydraulic unit that comprises a housing made of a conductive member; and
   a pin-shaped conductive connection member that electrically connects a ground line of the control unit, the housing of the motor and the housing of the hydraulic unit to each other;
   wherein the connection member is fixedly fitted into a hole provided in the hydraulic unit; and
   wherein a distal end of the connection member that is fitted into the hole of the hydraulic unit is made of a deformable member, and a maximum diameter of the distal end is larger than a diameter of the hole in the hydraulic unit.

2. The electric brake control apparatus according to claim 1, wherein a part of the connection member is fixed by an insulator.

* * * * *